June 16, 1931.  E. V. FRANCIS  1,810,416
TROLLEY CONVEYER
Filed Dec. 23, 1929   2 Sheets-Sheet 1
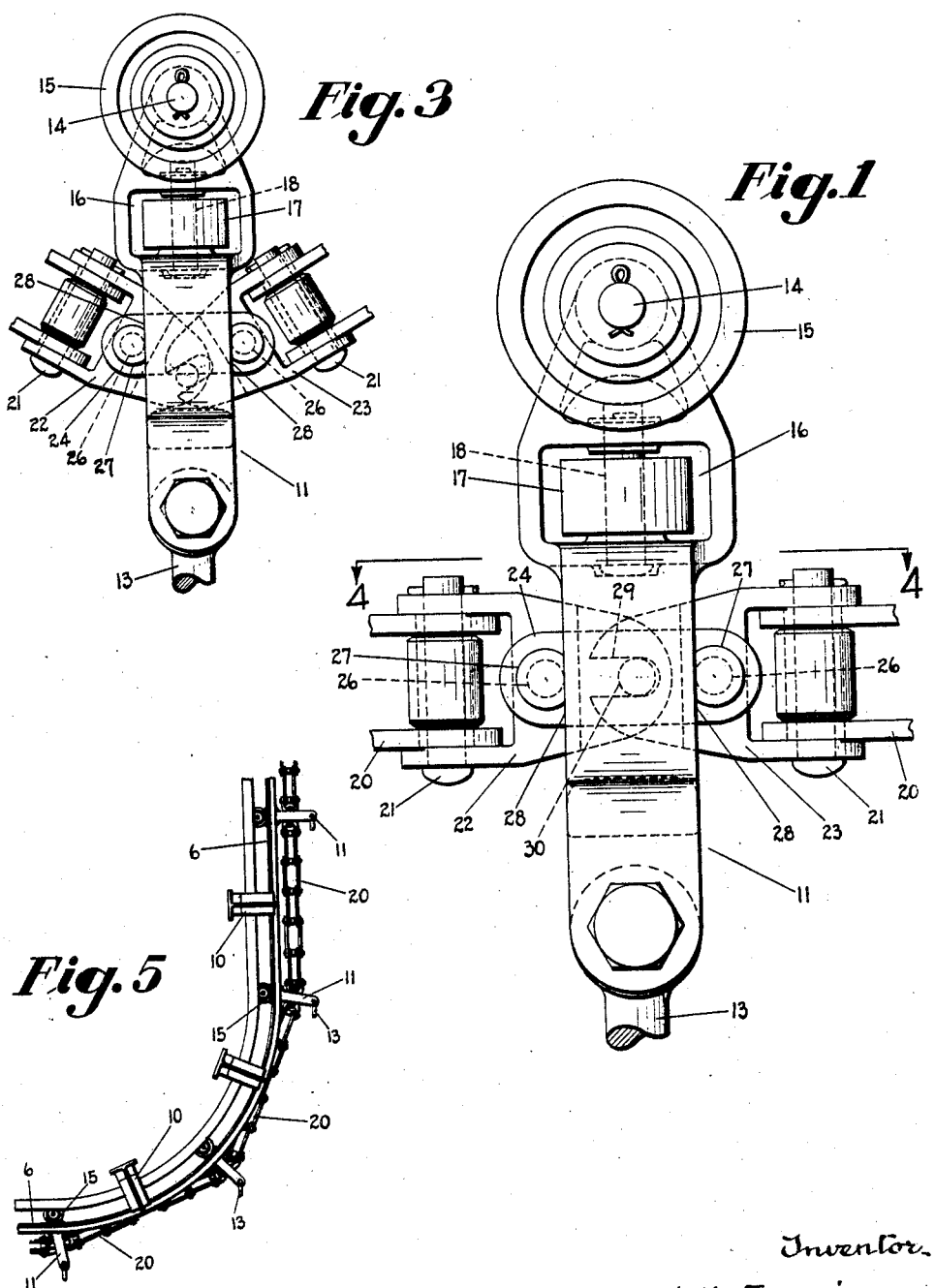
Inventor.
Earl V. Francis June 16, 1931.    E. V. FRANCIS    1,810,416
TROLLEY CONVEYER
Filed Dec. 23, 1929    2 Sheets-Sheet 2
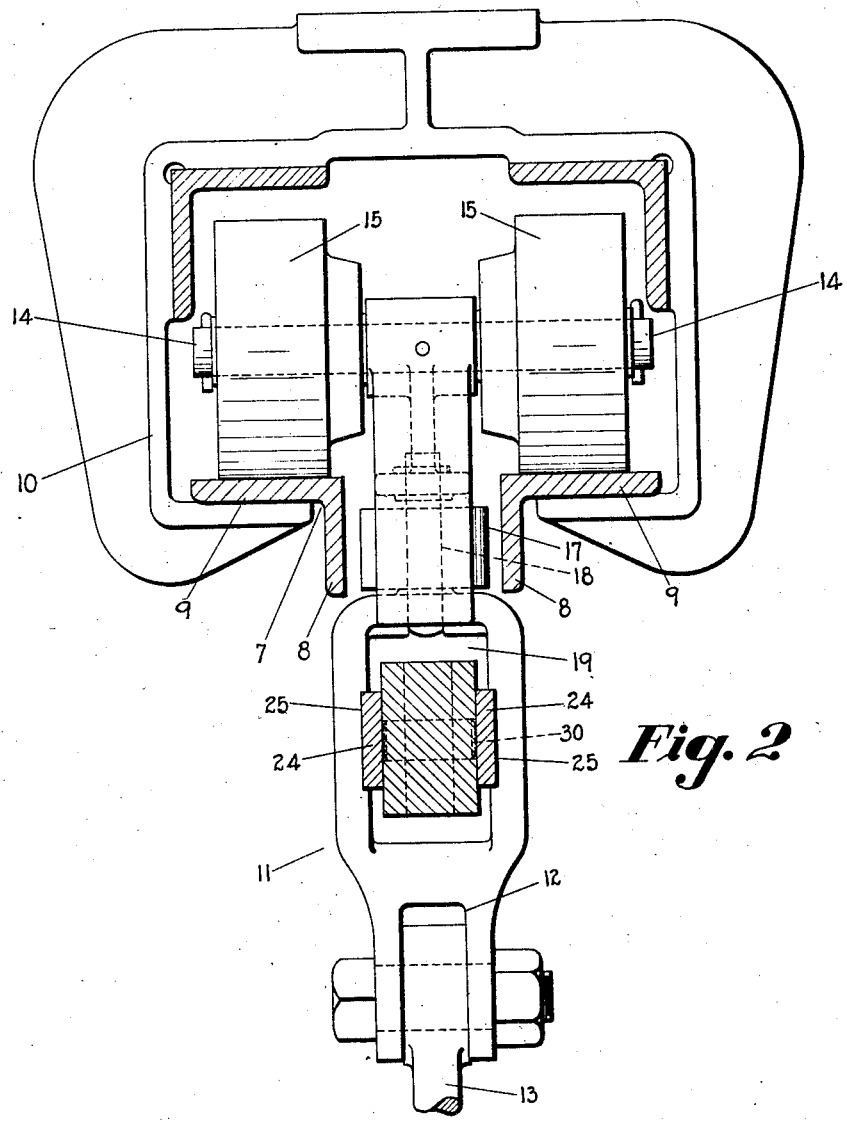
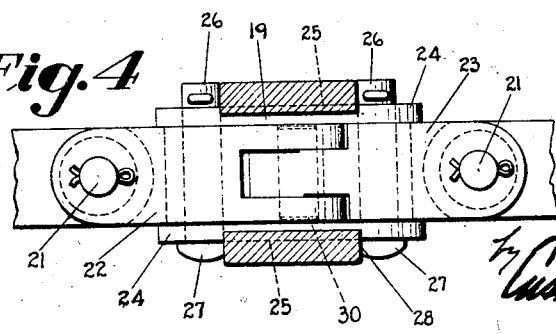
Inventor
Earle V. Francis.

Patented June 16, 1931

1,810,416

UNITED STATES PATENT OFFICE

EARLE V. FRANCIS, OF COLUMBUS, OHIO, ASSIGNOR TO THE JEFFREY MANUFACTURING COMPANY, OF COLUMBUS, OHIO, A CORPORATION OF OHIO

TROLLEY CONVEYER

Application filed December 23, 1929. Serial No. 416,187.

The present invention relates to new and useful improvements in trolley conveyers of the type including a series of load supports in the form of wheeled carriers supported upon and adapted to travel along an overhead trolley.

An important object of the invention is to provide a trolley conveyer in which the conveyer chain or draft device is a complete unit in itself, and is not dependent upon the load supports or wheeled carriers forming parts of the draft device or linkage of the draft chains.

Another important object of the invention is to provide a trolley conveyer of this character capable of performing the functions performed by the device disclosed in my copending application Serial No. 275,212, filed May 4, 1928; the important object of which application is to so arrange the parts of the conveyer that the center lines of the wheeled carriers will lie in the lines of reaction of the parts in passing about curves of the trackway whereby the load supports are maintained radial to the curve of the trackway and breaking stresses upon the chain are reduced to the very minimum.

Other objects and advantages of the invention will become apparent during the course of the following description.

In the accompanying drawings forming part of the disclosure, and wherein like numerals are employed to designate like parts throughout the several views:

Figure 1 is a side elevation of one of the trolley carriages or load supports shown associated with a draft chain.

Figure 2 is a vertical transverse sectional view of the conveyer showing an end elevation of one of the trolley carriages, the hanger mechanism therefor, and a transverse section of the trackway.

Figure 3 is a side elevation of the carriage illustrated in Figure 1, showing particularly the relation of the laterally extending portions of the chain with respect to the carriage when passing around a vertical curve in the trackway.

Figure 4 is a horizontal sectional view taken on the line 4—4 of Figure 1, looking in the direction of the arrows.

Figure 5 is a fragmentary side elevation of the conveyer shown passing around a vertical curve in a trackway.

Referring now more specifically to the detailed illustration of a preferred embodiment of the invention, the numeral 6 designates an overhead trackway of any desired construction, although here shown in the form of a pair of spaced parallel angle bars 7 arranged in opposed relation with their vertical flanges 8 depending from their horizontal flanges 9. These horizontal flanges are supported by substantially U-shaped hangers 10 suspended or supported in any suitable manner from the structural work of the building in which the trolley conveyer is to be installed.

The wheeled carriages or load supporting elements of the trolley conveyer are indicated in general by the numeral 11 consisting of a body having its lower end bifurcated, as at 12, for the pivotal support therein or a load carrying element 13. This load carrying element 13 may assume any desired form adaptable to the particular work for which the conveyer is installed.

The upper end of the trolley or load support is provided with a pair of oppositely laterally projecting axles 14, upon which are rotatably mounted rollers 15 adapted for support upon the horizontal flanges 9 of the trackway to travel therealong. Just below these rollers, the body of the hanger is pierced with a transverse opening 16, in which a guiding and anti-friction roller 17 is mounted on a vertical axis 18, so that the periphery of the roller 17 projects beyond the sides of the trolley in a position to engage the vertical depending flanges 8 of the angle bars to effectively guide the load supports 11 in their proper course of movement, while reducing friction which might otherwise occur between the load supports and trackway.

Immediately below the roller 17, the main body of the load support is pierced with a longitudinally extending aperture 19, through which a draft device is adapted to extend, as will now be more fully described.

This draft device is illustrated here as being a conveyer sprocket chain complete in itself, and composed of links 20 pivotally connected together on axes 21 arranged perpendicularly with respect to the horizontal flanges 9 of the trackway, whereby the chain is flexible in passing about horizontal curves in the trackway.

In order to provide for flexibility of the chain when passing about vertical curves of the trackway, and to maintain the load supports 11 substantially radial with respect to a curve in the track, either horizontal or vertical, linkages each including a pair of interengaged clevises 22 and 23, connect portions of the chain composed of the links 20 at spaced intervals throughout the length of the chain. These linkages provide means for connecting the load supports or carriages 11 to the chain, whereby the carriages are propelled along the track by movement of the draft chain. Each linkage extends through the aperture 19 in its respective carriage 11 and includes a link composed of a pair of side straps 24 extending through the opening 19 and seated in recesses 25 formed in the side walls of the opening 19, as shown to advantage in Figures 2 and 4. It is to be noted that the ends of these side straps 24 project at opposite sides of the load support or carriage, and are there provided with transverse pins 26, which extend through the clevises 22 and 23. It will, therefore, be evident that these pins 26 incorporate horizontal axes into the draft chain. This equips the draft chain to flex on axes at right angles to the vertical axes 21. Moreover, these pins 26 are arranged so that their main bodies contact with opposite sides of the load supports to associate the latter in definite relation with respect to the draft chain and cause their propulsion therewith. It will be noted that the heads 27 of these pins 26 are flattened longitudinally of the pin to be tangent to the main body thereof for contact with the vertical edges 28 of the load support. The pins therefore, in effect, provide the draft chain with abutments on opposite sides of the load supports, whereby the latter may be propelled in either direction by the chain.

Each pair of clevises 22 and 23 are related or interengaged in a manner to cause the portions of the chain at both sides of each load support to be disposed in the same angular relation with respect to the support when the latter is travelling about vertical curves of the trackway. This object may be accomplished in many different ways, the preferred form being that illustrated in the drawings and consisting of inter-engaging inner ends of the clevises which are arranged within the opening 19 in the load support. In the present example of this construction the clevis 23 has its inner end bifurcated, as at 29, to receive a transverse pin 30 carried in the bifurcated end of the clevis 22. By this construction, it will be seen that the trailing clevis will assume the same angular relations with respect to the load support, as that assumed by the leading clevis swinging upon its pivot 26, and will cause the load support to be maintained radial with respect to the curve it is traversing. In other words, the center line of the load support will lie on the line of reaction between the parts which is normal to the curve of the track, and will relieve the links and pintles from the imposition of breaking stresses; due to the portions of the chain between the load supports remaining straight and at equal angles with respect to the load supports at opposite sides thereof, as shown in Figure 5, when passing about vertical curves in the trackway. When traversing horizontal curves in the trackway, it will be seen that the individual links 20 of the chain sections will swing about their vertical axes 21 to impart the requisite horizontal flexibility to the chain when moving in such directions.

Due to the construction of the chain, it will be appreciated that it is a complete unit in itself and is not dependent upon the load supports or wheeled carriers forming linkage or parts thereof with the result that any one or more of the load supports or carriages can be removed without affecting the chain structure.

It is to be understood that various changes in the size, shape, and relationship of parts may be resorted to without departing from the spirit of the invention or the scope of the appended claims.

I claim:

1. In a trolley conveyer, the combination of a load support having an opening therethrough between its upper and lower ends; of an independent and complete draft element extending through said opening for propelling the load support.

2. In a trolley conveyer, the combination of a trolley hanger having an opening therethrough between its upper trolley end and its lower load supporting end; of an independent and complete draft element extending through said opening and having an abutment for engagement with the trolley hanger for propelling the same.

3. In a trolley conveyer, the combination of a load support having an opening therethrough; of an independent and complete draft element extending through said opening and projecting from opposite ends thereof and having abutments for engagement with opposite sides of said load support for propelling the same.

4. In a trolley conveyer, the combination with a load support having an opening therethrough; of a draft chain including a link extending through said opening and projecting on opposite sides thereof, and other links connected with the projecting ends of said link.

5. In a trolley conveyer, the combination with a load support having an opening therethrough; of a draft chain including a link extending through said opening and projecting on opposite sides thereof, and other links pivotally connected with the projecting ends of said link on axes at right angles to the axes of the draft chain links.

6. In a trolley conveyer, the combination with a load support having an opening therethrough; of a draft chain including a link extending through said opening and projecting on opposite sides thereof, clevises connected to the projecting ends of said link, and means cooperating with said clevises to cause them to assume substantially the same angular relation with respect to said load support.

7. In a trolley conveyer, the combination with a load support having an opening therethrough; of a draft chain including a link extending through said opening and projecting on opposite sides thereof, means to prevent relative movement between said link and load support, other links connected with the projecting ends of said link, and means cooperating with said other links to cause them to assume substantially the same angular relation with respect to said load support.

8. In a trolley conveyer, the combination with a load support having an opening therethrough; of a draft chain including a link extending through said opening, clevises connected to opposite ends of said link, and means cooperating with said clevises to cause them to assume substantially the same angular relation with respect to the load support.

9. In a trolley conveyer, the combination with a load support having an opening therethrough; of a draft chain including a link extending through said opening, clevises connected to opposite ends of said link, and a pin and slot connection between said clevises to cause them to assume substantially the same angular relation with respect to the load support.

10. In a trolley conveyer, the combination with a load support having an opening therethrough; of a draft chain including a link extending through said opening and projecting on opposite sides thereof, clevises pivotally connected to the opposite projecting ends of said link, and the means for pivoting said clevises abutting opposite sides of said load support to prevent relative movement between said link and load support.

11. In a trolley conveyer, the combination with a load support having an opening therethrough; of a draft chain including a link extending through said opening and projecting on opposite sides thereof, clevises pivotally connected to the opposite projecting ends of said link, the means for pivoting said clevises abutting opposite sides of said load support to prevent relative movement between said link and load support, and means cooperating with said clevises to cause them to assume substantially the same angular relation with respect to the load support.

12. In a trolley conveyer, the combination with a load supporting carriage having an opening therethrough; opposite walls of said openings having recesses, a link received in said recesses and extending through said opening to project beyond opposite ends thereof, and other links connected with the projecting ends of said link.

13. In a trolley conveyer, the combination with a load support having an opening therethrough; of a draft chain including horizontal and vertical axes, and a link of said chain having the horizontal axes being extended through said opening in the load support.

14. In a trolley conveyer, the combination with a load support having an opening therethrough; of a draft chain including a link extending through said opening, and other links of said draft chain connected together on vertical axes and to aforesaid link on horizontal axes.

15. In a trolley conveyer, the combination of a load support; of a draft chain including a link connected to the support, clevises connected to opposite ends of said link, and means cooperating with said clevises to cause them to assume substantially the same angular relation with respect to the support.

16. In a trolley conveyer, the combination of a load support; of a draft chain including a link connected to the support, clevises connected to opposite ends of said link, one of said clevises having a slot, and the other of said clevises having a pin operable in said slot.

17. In a trolley conveyer, the combination with a load support having an opening therethrough; of a draft chain including a link extending through said opening and projecting on opposite sides of said load support, a pair of clevises, pivot pins for pivotally connecting said clevises to the projecting ends of said link, and portions of said pins being flattened to engage opposite edges of said load support to prevent turning of the pins and movement of said link relative to said support.

In testimony whereof I have hereunto set my hand.

EARLE V. FRANCIS.